(12) United States Patent
Patel et al.

(10) Patent No.: US 7,650,608 B2
(45) Date of Patent: Jan. 19, 2010

(54) SYSTEM AND METHOD FOR APPLICATION AND RESOURCE DATA INTEGRATION

(75) Inventors: Ajay Patel, Yorba Linda, CA (US); Juan Manuel Andrade, Chatham, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 360 days.

(21) Appl. No.: 10/439,063

(22) Filed: May 15, 2003

(65) Prior Publication Data

US 2004/0088370 A1    May 6, 2004

Related U.S. Application Data

(60) Provisional application No. 60/381,026, filed on May 16, 2002.

(51) Int. Cl.
G06F 3/00 (2006.01)
G06F 7/00 (2006.01)

(52) U.S. Cl. .............................. 719/328; 707/3; 707/10; 719/311

(58) Field of Classification Search .............. 707/1–10; 709/201–207, 217–219; 715/501.1, 513, 715/733, 753, 741–743; 719/311, 328; 705/5–11
See application file for complete search history.

(56) References Cited

U.S. PATENT DOCUMENTS

| 6,065,002 | A  | * | 5/2000  | Knotts et al. ................... 707/4   |
| 6,167,405 | A  |   | 12/2000 | Rosensteel, Jr. et al. ..... 707/102 |
| 6,330,569 | B1 |   | 12/2001 | Baisley et al. ............... 707/203   |
| 6,704,724 | B1 | * | 3/2004  | Ellmann et al. ................. 707/4   |
| 6,725,212 | B2 | * | 4/2004  | Couch et al. .................... 707/2   |
| 6,785,673 | B1 | * | 8/2004  | Fernandez et al. ............. 707/3   |
| 6,915,507 | B1 | * | 7/2005  | Kaler et al. .................. 717/103   |
| 6,917,939 | B1 | * | 7/2005  | Baer et al. ..................... 707/10  |
| 7,035,842 | B2 | * | 4/2006  | Kauffman et al. .............. 707/3   |
| 7,058,698 | B2 | * | 6/2006  | Chatterjee et al. ........... 709/218  |
| 7,146,399 | B2 | * | 12/2006 | Fox et al. ..................... 709/203  |
| 7,152,062 | B1 | * | 12/2006 | Draper et al. ................... 707/4   |
| 7,197,491 | B1 | * | 3/2007  | Chou et al. ..................... 707/2   |
| 2002/0046209 | A1 | * | 4/2002  | De Bellis ....................... 707/10  |
| 2002/0069081 | A1 | * | 6/2002  | Ingram et al. .................. 705/1    |
| 2002/0147810 | A1 | * | 10/2002 | Traversat et al. ............ 709/224  |
| 2003/0105884 | A1 | * | 6/2003  | Upton .......................... 709/318  |
| 2004/0030685 | A1 | * | 2/2004  | Helles et al. ................... 707/3   |
| 2004/0128276 | A1 | * | 7/2004  | Scanlon et al. ................. 707/1    |
| 2006/0020586 | A1 | * | 1/2006  | Prompt et al. .................. 707/3   |
| 2007/0038610 | A1 | * | 2/2007  | Omoigui ........................ 707/3   |

OTHER PUBLICATIONS

Draper, "The Nimble Integration Engine™" ACM Sigmod May 21-24, 2001 Santa Barbara, CA, 2001 ACM 1-58113-332-4/01/05, 2 pages.

(Continued)

*Primary Examiner*—Li B Zhen
*Assistant Examiner*—Charles E Anya
(74) *Attorney, Agent, or Firm*—Fliesler Meyer LLP

(57) ABSTRACT

A software architecture that provides applications with uniform access to data that is available from heterogeneous data sources. Applications access Liquid Data through a set of unified XML views that have been derived from the schemas of the underlying data sources. Liquid Data provides data independence in that applications can write components that do not have to change if an underlying data source changes.

31 Claims, 6 Drawing Sheets

OTHER PUBLICATIONS

Nimble Technology, The Nimble Integration Suite™, Nimble Technology, Inc., 2000, 10 pages.

U.S. Appl. No. 60/300,385, filed Jun. 22, 2001, Omoigui.
U.S. Appl. No. 60/360,610, filed Feb. 28, 2002, Omoigui.

* cited by examiner

SYSTEM AND METHOD FOR APPLICATION AND RESOURCE DATA INTEGRATION

CLAIM OF PRIORITY

This application claims the benefit of U.S. Provisional Application No. 60/381,026, filed May 16, 2002, and is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to data integration methods and specifically to a system architecture for enabling application data integration.

BACKGROUND

The trend in enterprise or distributed computing, and in information processing in general, is toward sharing or integration of data sources between a variety of otherwise disparate applications. The traditional data processing architecture utilizes large-scale database systems, rarely if ever linked together by any intelligent means, that are used to serve up data to independent, focused, and often heavily customized applications. As a result of the historical legacy in computer architecture and the prevailing use of traditional methods of data processing, much useful data is locked in application "stove pipes", creating islands of information whose full potential is not fully realizable.

Integrating these islands of information is a complex and often costly exercise. Typically such projects require the skills of experienced data experts, and the need for expensive one-off data interfaces for each individual project. The result is a complex information technology (IT) environment, with continuously increasing maintenance needs and costs.

To address these issues, some system providers have turned to data warehousing techniques to better share and facilitate data exchange between an enterprise suite of applications. However, data warehousing alone cannot provide the answer—in most cases the data becomes stale too rapidly for meaningful or reliable integration. Data warehouses are of most use in decision support systems that rely on the ability to quickly scan a database or data repository and base a decision-making process on, and are of much less when the data changes rapidly. Enterprise Application Integration (EAI) systems have attempted to bring data warehousing benefits to the application level, but they typically demand procedural, synchronous programming that is highly optimized for tightly coupled applications. However, no mechanism currently exists for reliably and tightly coupling the wide variety of applications with the underlying data in a fully integrated manner.

SUMMARY

The invention includes a software architecture that provides applications with uniform access to data that is available from heterogeneous data sources. Applications access such data, hereafter referred to as "Liquid Data", through a set of unified XML views that have been derived from the schemas of the underlying data sources. Liquid Data provides a concept of data independence in the sense that application developers can write application components that do not need to be changed if an underlying data source changes. Benefits of the invention include the following:

Net App visual programming framework (with J2EE emphasis), together with a new approach to developing loosely coupled applications.

Better Java support for XML, promotion of XML as a first class citizen in Java language, and a Java component model/container for manipulating XML.

Uniform access to heterogeneous data sources via a Liquefaction mechanism.

Tools for schema merging to build composite liquid data schema.

XML Store, caching of Liquid Data, and meta data management.

Other benefits and features provided by the invention include a flexibility in adapting to changes in data sources and views, ease of application and data extension (across the Enterprise, or the Internet, etc.); data independence from changes in data sources; ease of maintenance/updates; reduced complexity in building applications; unified access to heterogeneous data; ability to contract development over less skilled resources; ability to focus development teams not on application development itself but on conversations, and assembly of network applications.

DETAILED DESCRIPTION

The following terms are used throughout this document, and take the following meaning and their equivalents:

Query—a single "find by primary key" request.

Liquefy—in one embodiment a set of Web service calls to data sources, that use XSL for transformation.

Merge—an XSL merge of transformed data.

Bind—an internally developed dynamic proxy component using application XML schema to bind requests and results from the liquid data framework to the client application.

To take full advantage of the invention, and due to the fact that extensive use is made of XML, very efficient XML parsers and compiled XSLT are used. XSLT is sufficient for transforming the structure of an XML document, but Java/XSL plug-ins can be used for actual data transformations or complex operations such as converting a birth date to an age.

Because of the associated overhead and complexity, Liquid Data is most appropriate for multiple distributed data sources, rather than those with simple data requirements. The actual of retrieving the data from the Liquid can be implemented by using finders like an entity bean, instead of the use of general queries.

To maximize performance, caching is used for the input argument transformations, and especially for key arguments. The information architect responsible for the initial configuration of the system should ideally be well versed in the various data resources available, due to the complexity of integrating multiple data schemas. The effort for the application developer in developing applications is however greatly reduced.

Figure 1:
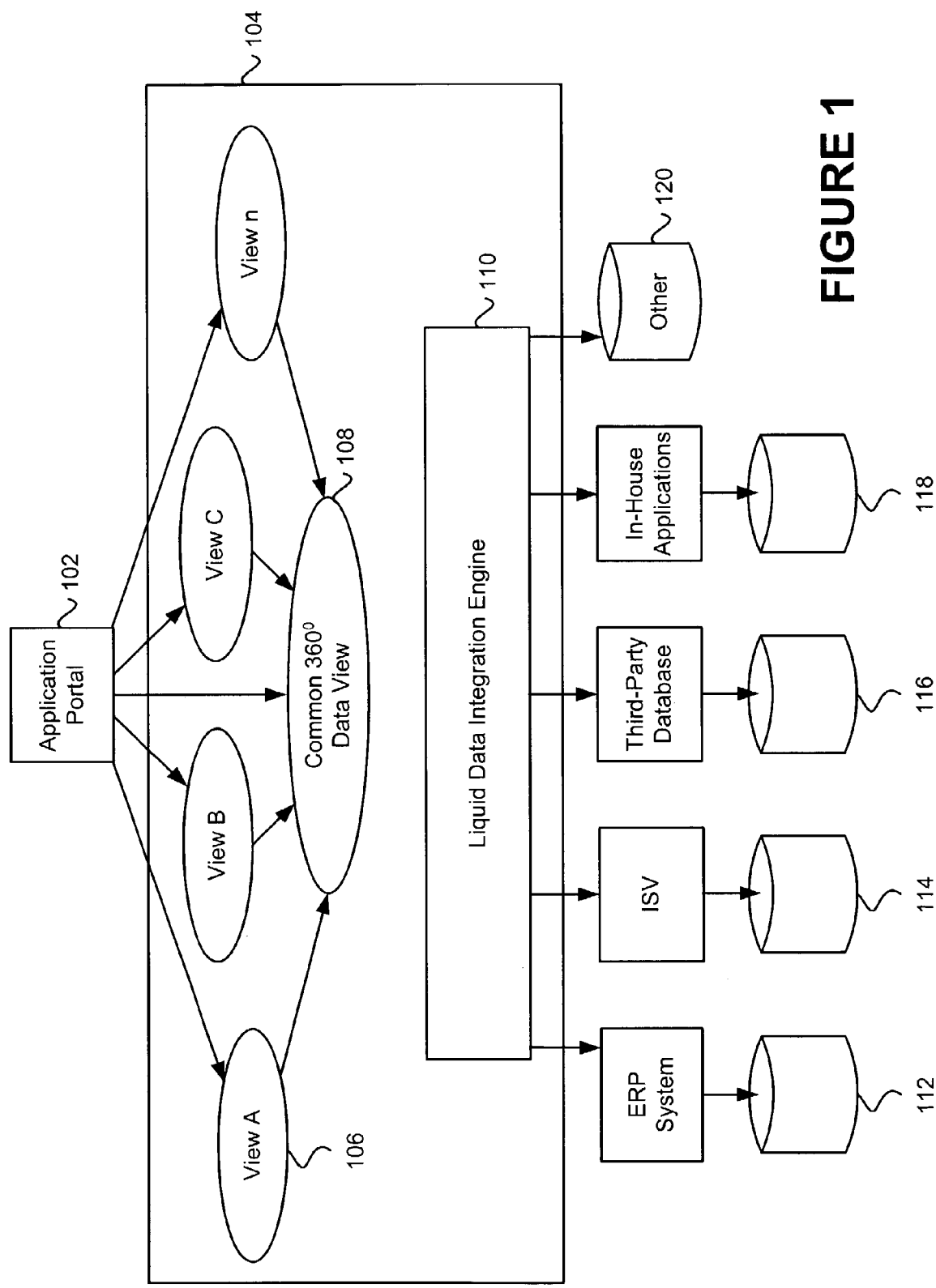
FIG. 1 is a schematic of a system architecture in accordance with an embodiment of the invention.

FIG. 1 is a schematic of a system architecture in accordance with an embodiment of the invention. As shown therein, a liquid data framework (LDF) 104 is used to provide a mechanism by which an application, or application portal 102, can integrate with, or otherwise access in a tightly couple manner, a plurality of data sources. Such data sources may include an Enterprise Resource and Planning (ERP) system 112, an Integrated Service Provider (ISV) 114, a third-party relational database 116, in-house or custom developed applications 118, or a variety of other data-related resources 120. Internally, the liquid data framework 104 employs a liquid data engine 110 to process requests from the application portal to the data resources. A view processor is used to provide a common view 108 into the available data resources, while a plurality of custom views 106 are used to filter, mold, or shape this common data view into a format specifically suited for each portal application.

Liquid Data Framework

Figure 2:
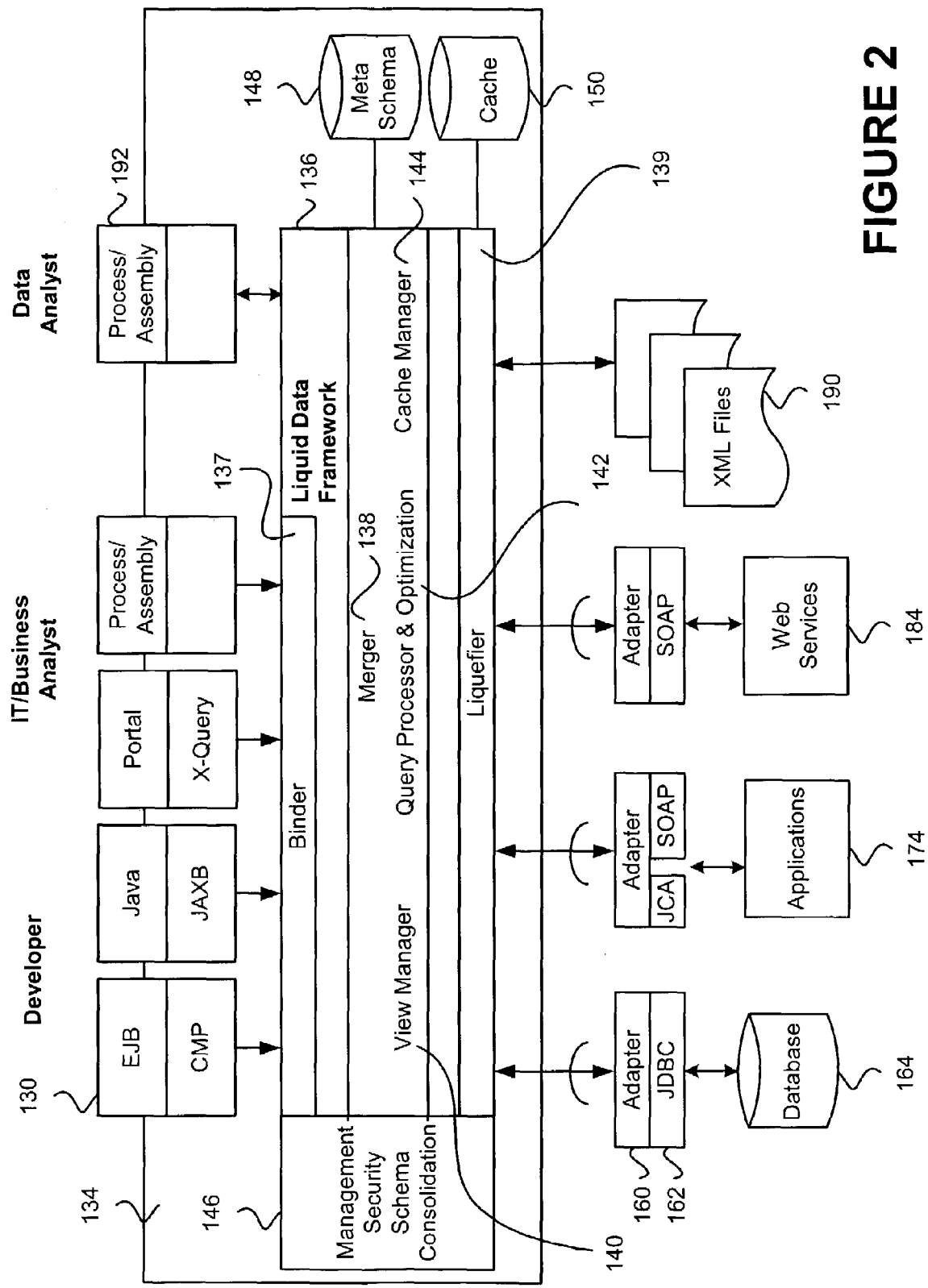
FIG. 2 is a schematic of a liquid data framework in accordance with an embodiment of the invention.

FIG. 2 is a detailed schematic of a liquid data framework in accordance with an embodiment of the invention. As shown therein, the data framework 134 includes a plugin mechanism by which developers and business analysts can plug in client or portal applications 130. The liquid data framework allows access to a wide variety of data resources, including databases 164, server-based or peer-based applications 174, and Web services 184. Typically such access is via an adaptor or interface 160, designed specifically for the type of data resource, but generic enough to be used for all data resources of that type. For example, as shown in FIG. 2, a database adaptor 160 may include a JDBC component 162 that allows access to all equivalent JDBC-accessible databases.

Within the framework itself, a binder mechanism is used to bind requests from the client applications to the framework itself. A merger 138, that includes a query processor, takes these requests and processes them in a way that makes sense to the liquid data framework. The actual mechanism and rules used to process requests can be specified by a data analyst 192 during a setup procedure, and the processing rules themselves stored in a meta schema database 148. A liquefier passes the now processed requests to the adaptors for relay to the data resources. The actual format in which the requests are phrased can be determined by a plurality of XML files 190 that define the liquefier's data handling properties.

When the data resource responds with actual data, the liquid data framework is used to translate the data into a format usable by the client or portal application. As responses or results are passed back to the merger, a view manager 140 molds or shapes the results into a format understandable by the calling application. At this point, a custom view may be used to filter the data to meet the specific needs of the portal application. When properly formed, the response is bound, again using the binder, and returned to the calling application 130.

Figure 3:
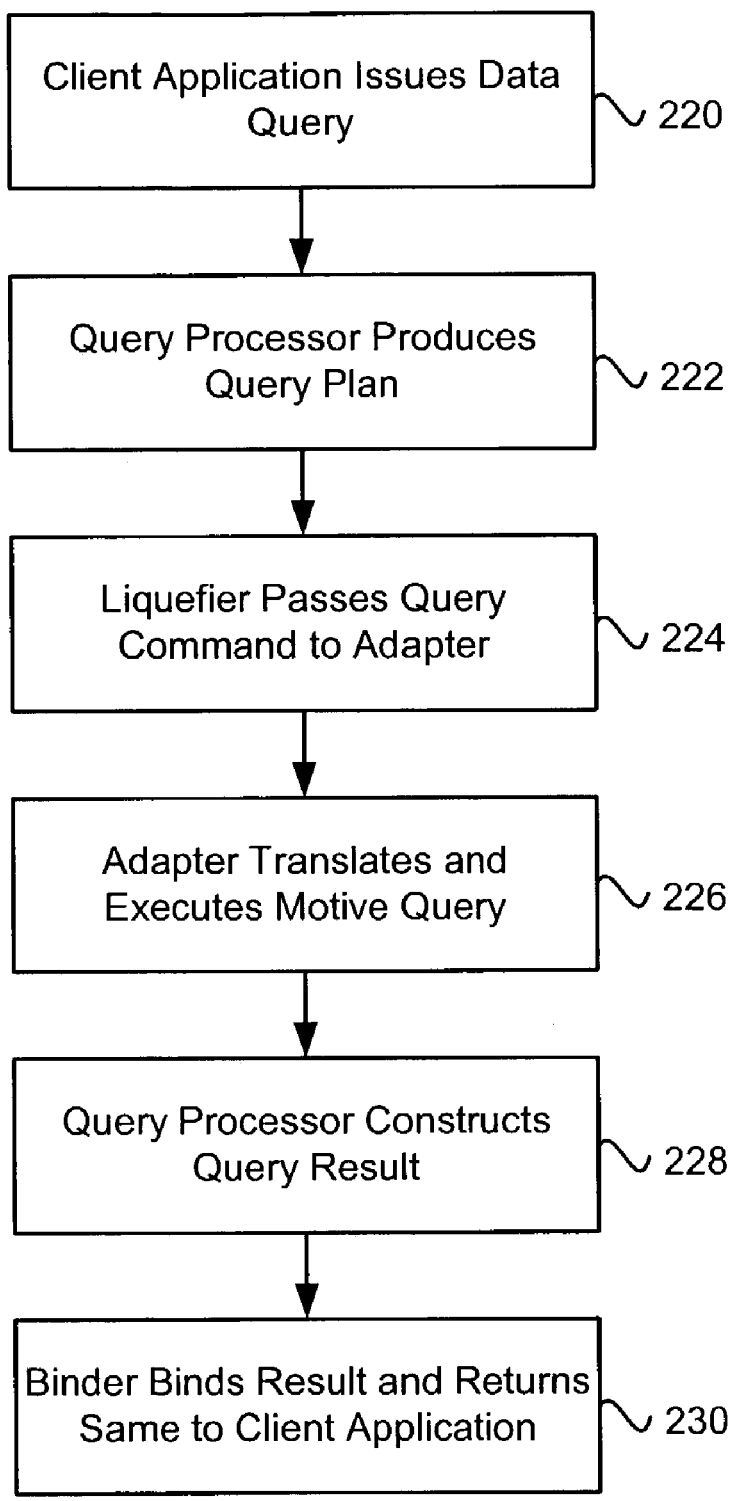
FIG. 3 is a flowchart of a liquid data framework process in accordance with an embodiment of the invention.

FIG. 3 is a flowchart of a process used by the liquid data framework to parse requests to access data resources in a tightly coupled manner. As shown in FIG. 3, in step 220 the client application issues a data query, for example a request to access, read, modify, or update a particular piece of data. In step 222 the query processor generates a query plan. The query plan is determined in accordance with a set of rules previously defined by the data analyst, who uses a knowledge of the underlying data resources to create optimal query paths. The query plan also takes into account the destination or target of each query, so that individual components of the plan may be directed to different data resources. In step 224 the liquefier passes the query (as part of the query plan) to the designated adaptor (or adaptors). The adaptor, in step 226, in turn passes the request to the data resource for execution. Following execution, when a response, result, or update, has been generated, in step 228 the query processor of the liquid data framework constructs a query result. This result can be modified or shaped to reflect a particular custom view, as defined or required by the calling application itself. In step 230, the binder binds the result, and returns it to the client or portal application.

Unified Data Description Mechanism

A feature of the invention is its ability to provide a unified data description mechanism, that can then be used to provide customized and yet tightly coupled access for a client application to one or more data resources. A large number of data resources can be accessed simultaneously, providing the illusion of a totally integrated, enterprise-spanning, and uniformly integrated data source.

Figure 4:
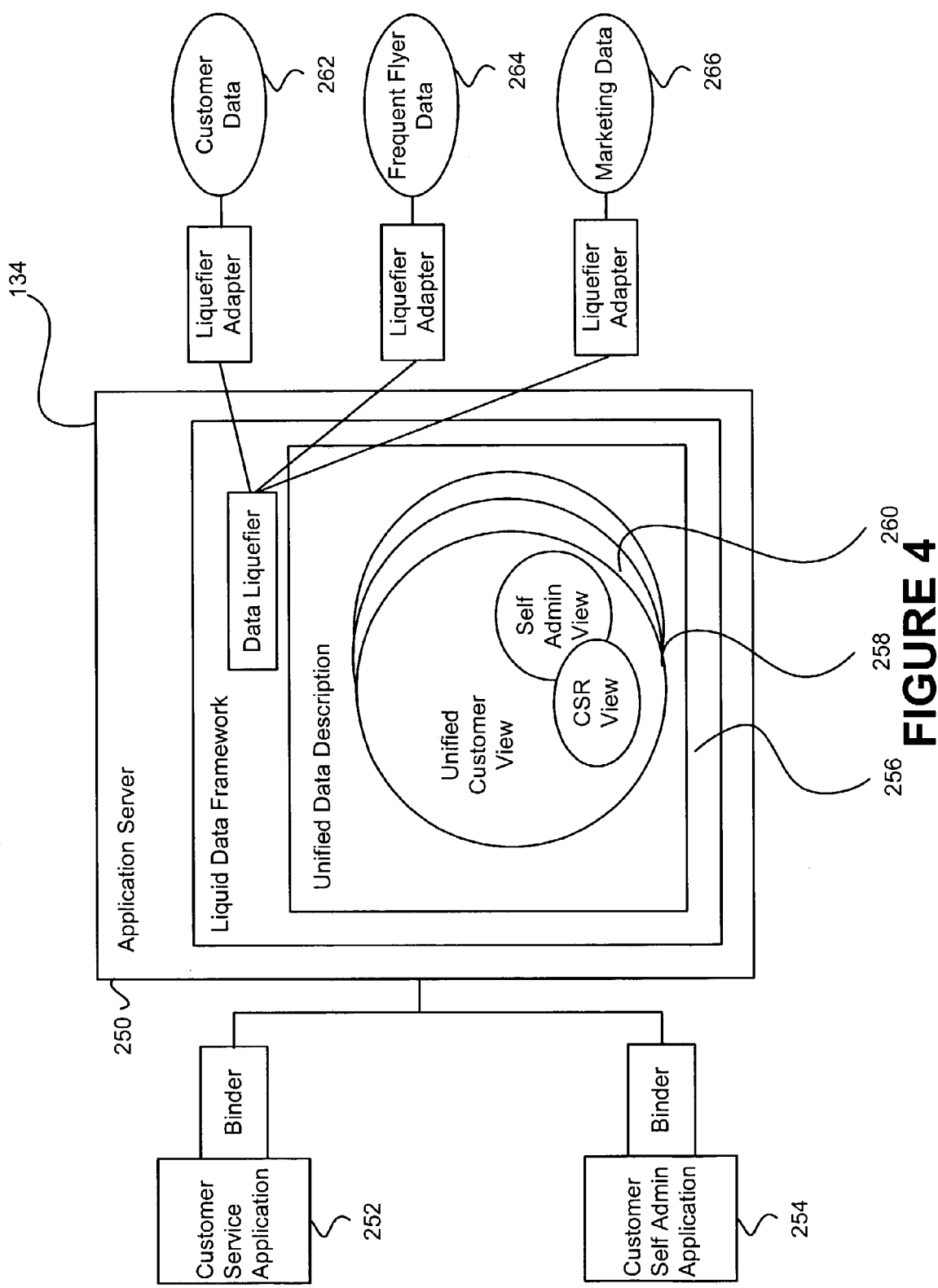
FIG. 4 is a schematic of a unified data description mechanism in accordance with an embodiment of the invention.

FIG. 4 is a schematic of a unified data description mechanism in accordance with an embodiment of the invention, as it may used in a specific example of providing data access to two different client applications—in this example a customer service application 252, and a customer self-admin application 254 as might be used with an airline ticketing system. The applications are both designed to access the same set of data resources, in this instance a customer data resource 262, a frequent flyer data resource 264, and a marketing data resource 266. Each data resource includes it's own liquefier adaptor for communication with the liquid data framework. The liquid data framework may itself be build upon or within an application server framework 250, such as the Weblogic family of products from BEA systems, Inc, San Jose, Calif. Other application servers could be used, or could incorporate aspects or functionality of the liquid data framework, while remaining within the spirit and scope of the invention. The liquid data framework includes a data liquefier, as describe above, which used a knowledge of the total data content to maintain a unified customer view, and to generate as subsets of this view individual views customized to the needs of the particular application. In the example shown in FIG. 4, the unified customer view contains a customer service view and a customer self admin view that are customized individually for the customer service and customer self admin applications respectively. Views can be contained within one another, or may intersect.

Figure 5:
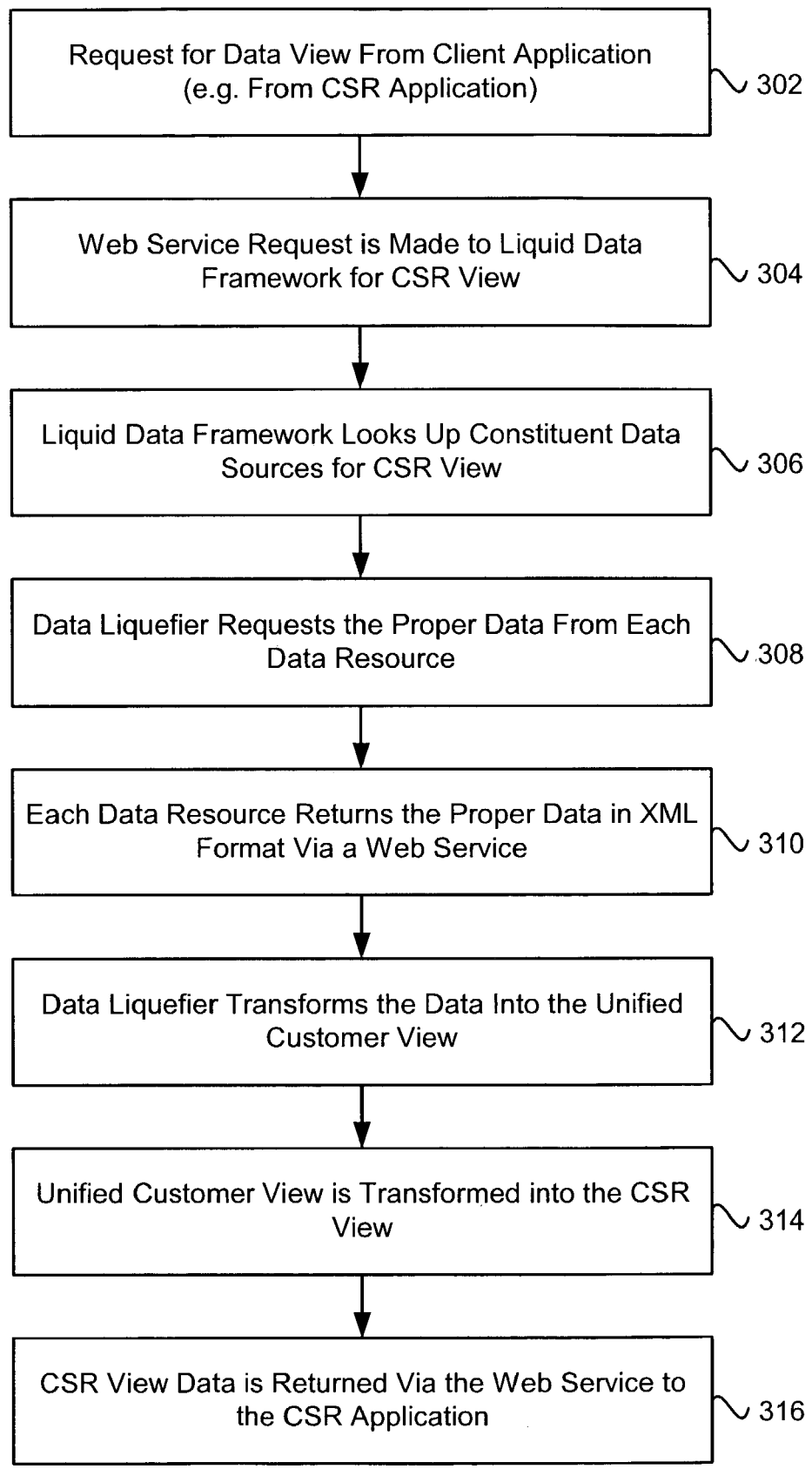
FIG. 5 is a flowchart of a unified data description mechanism process in accordance with an embodiment of the invention.

FIG. 5 is a flowchart of a unified data description mechanism process in accordance with an embodiment of the invention, that illustrates the steps used by the example of FIG. 4 in providing data access to the applications described therein. As shown in FIG. 5, the process begins in step 302 with a request from an application (in this example a Customer Service Rep (CSR) application) to view a particular data. In step 304 a Web service request is made to the liquid data framework, specifying the CSR view. The LDF looks up the constituent data sources for the CSR view in step 306, and in step 308 the data liquefier requests the correspondingly denoted or proper data from each referenced source. In step 310, as each data source responds, its response is returned to the liquid data framework in the proper XML format, again via a Web service. The liquid data framework then in step 312, transforms this data into a unified customer view. In step 314, the data is again transformed, molded, or filtered, to reflect the particular application view desired, and in step 316 the appropriate data is returned to the calling application, in the correct view format, in this instance via a Web service.

Sample Implementation

Figure 6:
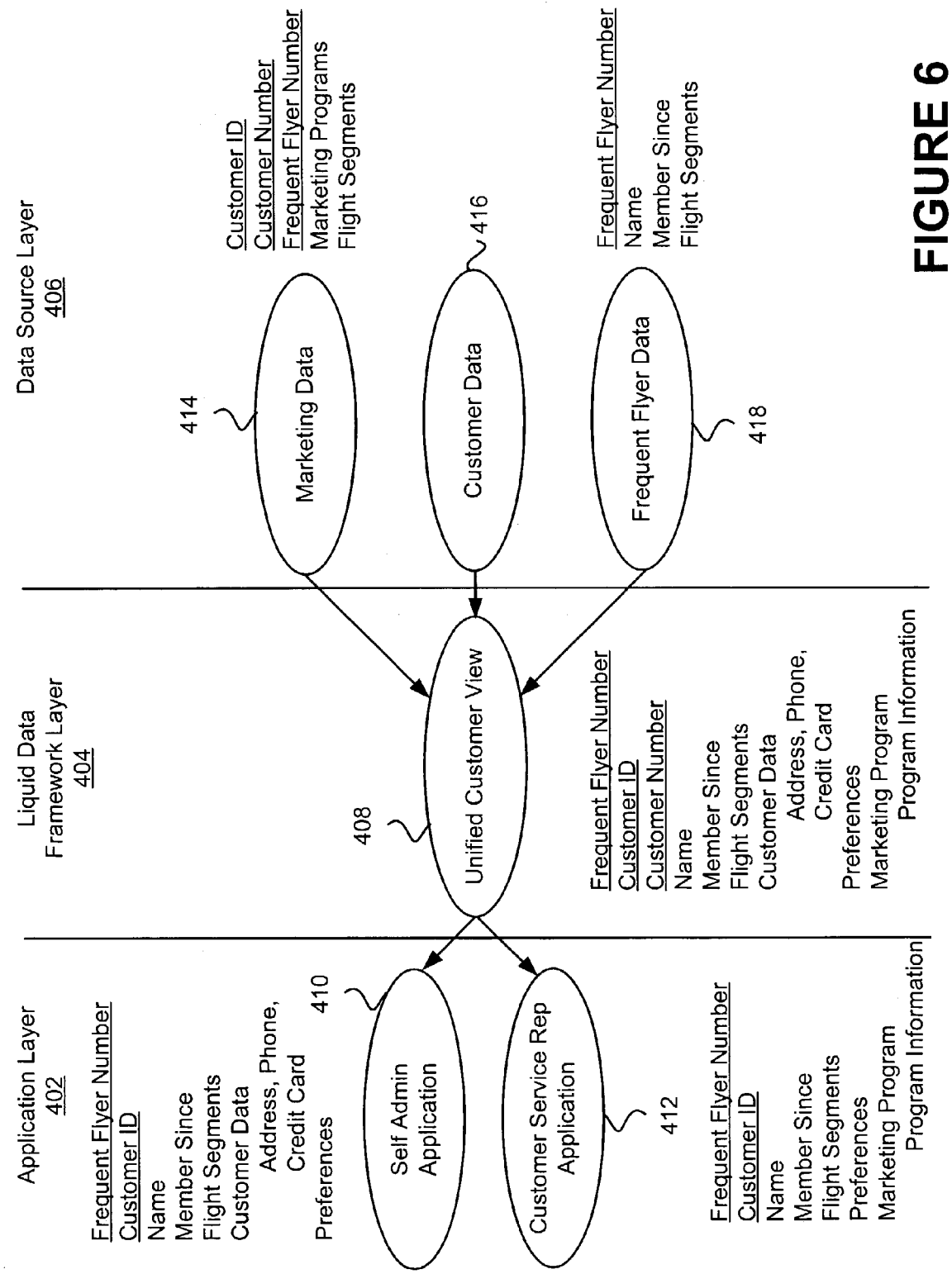
FIG. 6 is a schematic of a specific implementation of a unified data description mechanism in accordance with an embodiment of the invention.

The following section briefly illustrates some advantages of the invention when applied to a specific sample implementation, such as that of an airline customer service and ticketing system. FIG. 6 is a schematic of a specific implementation of a unified data description mechanism in accordance with an embodiment of the invention, including a data source layer 406, a liquid data layer 404, and an application layer 402, and illustrates the following four scenarios:

Customer Service Application

In this scenario three data sources are used—Main customer data source 416; Frequent flyer data source 418; and Marketing data source 414. One unified customer view 408 provides the main customer view. One application data view provides the customer service view 412. This scenario illustrates how to use Liquid Data for an application, such as a Customer Service Rep application in this example.

Customer Self Admin Application

Here, we are using the same back-end data sources (414, 416, 418) and the same unified customer view 408. A self-admin application view 410 can be used to access a different view of the data via the common unified customer view 408. This scenario shows how an existing data infrastructure can be re-used.

Data Source Modification

This scenario shows that a back end data source change requires only a change to an XSL transform. This can be taken care of with a graphical tool.

Best Effort Programming

If a data source is unavailable, the Liquid Data framework will provide as much data as possible.

The invention is particularly useful in providing flexibility in adapting application access to changes in data sources and views. The techniques provided herein can be extended with ease to other data distribution models (Enterprise, Internet, etc). Data independence can be maintained throughout changes in data sources. The invention is also useful for allowing ease of maintenance/updates, and reduced complexity in building applications. A feature of the liquid data framework provided by the invention is its unified access to heterogeneous data. This allows an open, flexible, standards based foundation for a new programming model or methodology. Software development can be accomplished by less skilled resources, and development teams can be focused on conversations and assembly of network applications. As such, ISV's can easily adapt to the changes in the underlying framework.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers and systems may use and benefit from the invention.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system providing applications with uniform access to data from distributed heterogeneous data sources on computer-readable storage media, comprising:
   a processor;
   a liquid data framework (LDF), wherein the liquid data framework includes:
   a binder that uses Extensible Markup Language (XML) schemas from the distributed heterogeneous data sources to bind requests and results to a requesting application, wherein the binder is a dynamic proxy component on a server, wherein the distributed heterogeneous data sources can include any data source that has an XML schema;
   a query processor that receives the requests from the binder and generates query plans, wherein each of the query plans direct individual components of the query plan to different distributed heterogeneous data sources and wherein each query plan is determined by a set of rules which can be edited to alter processing of queries;
   a merger to perform a merge of transformed data from a plurality of the distributed heterogeneous data sources;
   a plug-in mechanism that allows client or portal applications to be plugged in to the liquid data framework; and
   a set of unified XML views derived from the XML schemas of the distributed heterogeneous data sources, wherein the liquid data framework provides data independence for the client or portal applications in that the client or portal applications that use the system need not be changed if a source of data for an application switches from one type of heterogeneous data source to another type of heterogeneous data source, the liquid data framework uses the XML schemas of the heterogeneous data sources to determine the source of data and can change the source of data as a result of changes in the XML schema of at least one of the heterogeneous data sources; and wherein the heterogeneous data sources includes a database, and a web service, and wherein the web services communicate the query plans to resource adaptors for the distributed heterogeneous data sources and receive corresponding results that are returned from the resource adaptors, wherein the web services use Extensible Stylesheet Language (XSL) to transform the query plans and the corresponding results.

2. The system of claim 1, further comprising:
a database adaptor that permits access to a database.

3. The system of claim 1, further comprising:
a plurality of XML files that determine a format in which requests to access data or resources are to be phrased.

4. The system of claim 1, wherein individual views are generated as subsets of a unified customer view.

5. A system including one or more processors operable to allow client applications to communicate with distributed server applications and data sources, by means of a set of unified Extensible Markup Language (XML) views derived from the schemas of the distributed server applications and data sources, comprising:
a processor;
a liquid data framework (LDF) comprising:
a binder that uses XML schemas from the distributed server applications and data sources to bind requests and results from the system to a requesting application, wherein the binder is a dynamic proxy component on a server, wherein the distributed server applications and data sources can include any data source that has an XML schema;
a query processor that receives the requests from the binder and generates query plans, wherein each of the query plans direct individual components of the query plan to different distributed server applications and resources and wherein each query plan is determined by a set of rules which can be edited to alter processing of queries;
a plug-in mechanism that allows client or portal applications to be plugged in to the liquid data framework;
a merger to perform a merge of transformed data from a plurality of the distributed server applications and data sources;
a set of unified XML views derived from the XML schemas of the distributed server applications and data sources; and
an XML interface that defines the content and layout of the data resources to be accessed;
wherein the liquid data framework provides data independence for the client or portal applications in that the client or portal applications that use the liquid data framework need not be changed if a source of data for an application switches from one type of heterogeneous data source to another type of heterogeneous data source, the system uses the XML schemas of the heterogeneous data sources to determine the source of data and can change the source of data as a result of changes in the XML schema of at least one of the heterogeneous data sources; and
wherein the heterogeneous data sources includes a database, and a web service, and wherein the web services communicate the query plans to resource adaptors for the distributed heterogeneous data sources and receive corresponding results that are returned from the resource adaptors, wherein the web services use Extensible Stylesheet Language (XSL) to transform the query plans and the corresponding results.

6. The system of claim 5, further comprising:
a database adaptor that permits access to a database.

7. The system of claim 5, further comprising:
a plurality of XML files that determine a format in which requests to access data or resources are to be phrased.

8. The system of claim 5, wherein individual views are generated as subsets of a unified customer view.

9. A system including one or more processors operable for uniform data access between a set of client applications and a set of distributed server resources such as server applications, server data sources, and server databases, comprising:
a processor;
a liquid data framework (LDF) comprising:
a binder that uses Extensible Markup Language (XML) schemas from the distributed server applications and data sources to bind requests and results from the system to a requesting application, wherein the binder is a dynamic proxy component on a server, wherein the distributed server applications and data sources can include any data source that has an XML schema;
a query processor that receives the requests from the binder and generates query plans, wherein each of the query plans direct individual components of the query plan to different distributed server applications and resources and wherein each query plan is determined by a set of rules which can be edited to alter processing of queries;
a plug-in mechanism that allows client or portal applications to be plugged in to the liquid data framework;
a set of server resources accessible to said set of client or portal applications via said liquid data framework; and
a merger to perform a merge of transformed data from a plurality of the server resources;
wherein the liquid data framework provides data independence for the client or portal applications in that the client or portal applications that use the system need not be changed if a source of data for an application switches from one type of heterogeneous data source to another type of heterogeneous data source, the liquid data framework uses the XML schemas of the heterogeneous data sources to determine the source of data and can change the source of data as a result of changes in the XML schema of at least one of the heterogeneous data sources; and
wherein the heterogeneous data sources includes a database, and a web service, and wherein the web services communicate the query plans to resource adaptors for the distributed heterogeneous data sources and receive corresponding results that are returned from the resource adaptors, wherein the web services use Extensible Stylesheet Language (XSL) to transform the query plans and the corresponding results.

10. The system of claim 9, further comprising:
a database adaptor that permits access to a database.

11. The system of claim 9, further comprising:
a plurality of XML files that determine a format in which requests to access data or resources are to be phrased.

12. The system of claim 9, wherein individual views are generated as subsets of a unified customer view.

13. A method for providing client access to resources, comprising the steps of:
receiving, from a client or portal application, a request to modify data stored in a plurality of data resources at a liquid data framework (LDF), wherein the liquid data framework includes a query processor, merger, and binder, wherein the liquid data framework provides data independence for client or portal applications in that the client or portal applications need not be changed if a source of data for an application switches from one type of data resources to another type of data resources, the liquid data framework uses XML schemas of the data resources to determine the source of data and can change the source of data as a result of changes in the XML schema of at least one of the data resources;

generating a query plan, including a query by the query processor;

communicating said query to a plurality of resource adapters;

binding, by the binder, requests and results to a requesting application;

communicating from each of the plurality of resource adapters to each of the plurality of data resources the query for execution, wherein the data resources includes a database, and a web service;

receiving a result from each data resource in the plurality of data resources;

performing a merge to construct a unified customer view from all of the results by the merger;

modifying the unified customer view to reflect a particular customized view as required by the portal application; and returning the customized view to the portal application.

14. The method of claim 13, wherein retrieving data from the unified customer view is implemented using a find by primary key request.

15. The method of claim 13, wherein the query uses a single find by primary key request.

16. The method of claim 13, further comprising:
accessing a plurality of Extensible Markup Language (XML) files that determine a format in which requests to access data or resources are to be phrased.

17. The method of claim 13, further comprising:
performing an XSL merge to transform results from each data resource into the unified customer view.

18. The method of claim 13, wherein individual views are generated as subsets of the unified customer view.

19. A method, comprising:
receiving, from a client or portal application, a request to modify data stored in a plurality of data resources at a liquid data framework (LDF), wherein the liquid data framework includes a query processor, merger, and binder, wherein the liquid data framework provides data independence for client or portal applications in that the client or portal applications need not be changed if a source of data for an application switches from one type of data resources to another type of data resources, the liquid data framework uses XML schemas of the data resources to determine the source of data and can change the source of data as a result of changes in the XML schema of at least one of the data resources;

generating a query plan, including a query by the query processor;

making a web service request for the data view;

looking up constituent data sources for the data view, wherein a data framework looks up the data sources, wherein the data resources includes a database, and a web service;

requesting data from each data resource;

binding, by the binder, requests and results to a requesting application;

receiving data from each data resource in Extensible Markup Language (XML) format via a web service;

performing a merge by the merger to transform received data from each data resource into a unified customer view of the data;

transforming the unified customer view of the data into a customized view of the data for the client application; and returning the customized view of the data via a web service to the client application.

20. The method of claim 19, further comprising:
accessing a plurality of XML files that determine the format in which requests to access data or resources are to be phrased.

21. The method of claim 19, further comprising:
determining a query plan according to a set of rules which can be edited to alter processing of queries by the system.

22. The method of claim 19, wherein individual views are generated as subsets of the unified customer view.

23. A computer-readable storage medium, including instructions stored thereon which when read and executed by a computer cause the computer to perform steps comprising:
receiving, from a client or portal application, a request to modify data stored in a plurality of data resources at a liquid data framework (LDF), wherein the liquid data framework includes a query processor, merger, and binder, wherein the liquid data framework provides data independence for client or portal applications in that the client or portal applications need not be changed if a source of data for an application switches from one type of data resources to another type of data resources, the liquid data framework uses XML schemas of the data resources to determine the source of data and can change the source of data as a result of changes in the XML schema of at least one of the data resources;

generating a query plan, including a query by the query processor;

communicating said query to a plurality of resource adapters;

binding, by the binder, requests and results to a requesting application;

communicating from each of the plurality of resource adapters to each of the plurality of data resources the query for execution, wherein the data resources includes a database, and a web service;

receiving a result from each data resource in the plurality of data resources;

performing a merge to construct a unified customer view from all of the results by the merger;

modifying the unified customer view to reflect a particular customized view as required by the portal application; and returning the customized view to the portal application.

24. The computer-readable storage medium of claim 23, further comprising:
providing a plug-in mechanism that allows for the plug-in of client or portal applications.

25. The computer-readable storage medium of claim 23, further comprising:
providing a database adaptor that permits access to a database.

26. The computer-readable storage medium of claim 23, further comprising:
accessing a plurality of Extensible Markup Language (XML) files that determine the format in which requests to access data or resources are to be phrased.

27. The computer-readable storage medium of claim 23, wherein individual views are generated as subsets of the unified customer view.

28. A computer-readable storage medium, including instructions stored thereon which when read and executed by a computer cause the computer to perform steps comprising:

receiving, from a client or portal application, a request to modify data stored in a plurality of data resources at a liquid data framework (LDF), wherein the liquid data framework includes a query processor, merger, and binder, wherein the liquid data framework provides data independence for client or portal applications in that the client or portal applications need not be changed if a source of data for an application switches from one type of data resources to another type of data resources, the liquid data framework uses Extensible Markup Language (XML) schemas of the data resources to determine the source of data and can change the source of data as a result of changes in the XML schema of at least one of the data resources;

generating a query plan, including a query by the query processor;

making a web service request for the data view;

looking up constituent data sources for the data view, wherein a data framework looks up the data sources, wherein the data resources includes a database, and a web service;

requesting data from each data resource;

binding, by the binder, requests and results to a requesting application;

receiving data from each data resource in Extensible Markup Language (XML) format via a web service;

merging by the merger the received data into a unified customer view of the data;

transforming the unified customer view of the data into a customized view of the data for the client application; and returning the customized view of the data via a web service to the client application.

29. The computer-readable storage medium of claim 28, wherein caching is used for input argument transformations and key arguments.

30. The computer-readable storage medium of claim 28, wherein XSL Transformations (XSLT) is used for transforming structure of an XML document and Java/XSL plug-ins are used for data transformations and complex operations.

31. The computer-readable storage medium of claim 28, wherein individual views are generated as subsets of the unified customer view.

* * * * *

UNITED STATES PATENT AND TRADEMARK OFFICE
CERTIFICATE OF CORRECTION

| | | |
|---|---|---|
| PATENT NO. | : 7,650,608 B2 | Page 1 of 1 |
| APPLICATION NO. | : 10/439063 | |
| DATED | : January 19, 2010 | |
| INVENTOR(S) | : Ajay Patel et al. | |

It is certified that error appears in the above-identified patent and that said Letters Patent is hereby corrected as shown below:

On the title page, item (75), in column 1, in "Inventors", line 2, delete "Chatham, CA" and insert -- Morristown, NJ --, therefor.

In column 3, line 38, delete "plugin" and insert -- plug-in --, therefor.

In column 3, line 39, delete "plug in" and insert -- plug-in --, therefor.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,650,608 B2 Page 1 of 1
APPLICATION NO. : 10/439063
DATED : January 19, 2010
INVENTOR(S) : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Twenty-third Day of November, 2010

David J. Kappos
*Director of the United States Patent and Trademark Office*